United States Patent
Alspaugh et al.

(10) Patent No.: US 10,315,852 B1
(45) Date of Patent: Jun. 11, 2019

(54) ON-DEMAND V-SHAPED CONVEYOR

(71) Applicant: Amazon Technologies, Inc., Seattle, WA (US)

(72) Inventors: David Alspaugh, Seattle, WA (US); Sean Murphy, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/665,105

(22) Filed: Jul. 31, 2017

(51) Int. Cl.
    *B65G 17/06* (2006.01)
    *B65G 15/40* (2006.01)
    *B65G 21/20* (2006.01)
    *B65G 39/10* (2006.01)
    *B65G 39/18* (2006.01)
    *B65G 39/20* (2006.01)
    *B65G 13/073* (2006.01)
    *B65H 5/06* (2006.01)

(52) U.S. Cl.
    CPC .......... *B65G 39/20* (2013.01); *B65G 13/073* (2013.01); *B65G 15/40* (2013.01); *B65G 21/2063* (2013.01); *B65G 39/10* (2013.01); *B65G 39/18* (2013.01); *B65H 5/06* (2013.01); *B65H 2404/111* (2013.01)

(58) Field of Classification Search
    CPC .......... B65G 17/10; B65G 17/06; B65G 15/40
    See application file for complete search history.

(56) References Cited

U.S. PATENT DOCUMENTS 9,415,938 B2 * 8/2016 Oropeza ................. B07B 13/04

* cited by examiner

*Primary Examiner* — Gene O Crawford
*Assistant Examiner* — Lester Rushin, III
(74) *Attorney, Agent, or Firm* — BakerHostetler

(57) ABSTRACT

A conveyor system includes a belt wound around a roller assembly along a belt axis. The belt is configured to convey objects along the roller assembly in a direction of conveyance. The belt includes a primary belt portion that is in contact with rollers of the roller assembly and defines the belt axis. The conveyor includes an actuator configured to cause the belt to selectively define at least one belt peak that protrudes from the primary belt portion at a peak height measured orthogonally from the belt axis.

20 Claims, 8 Drawing Sheets

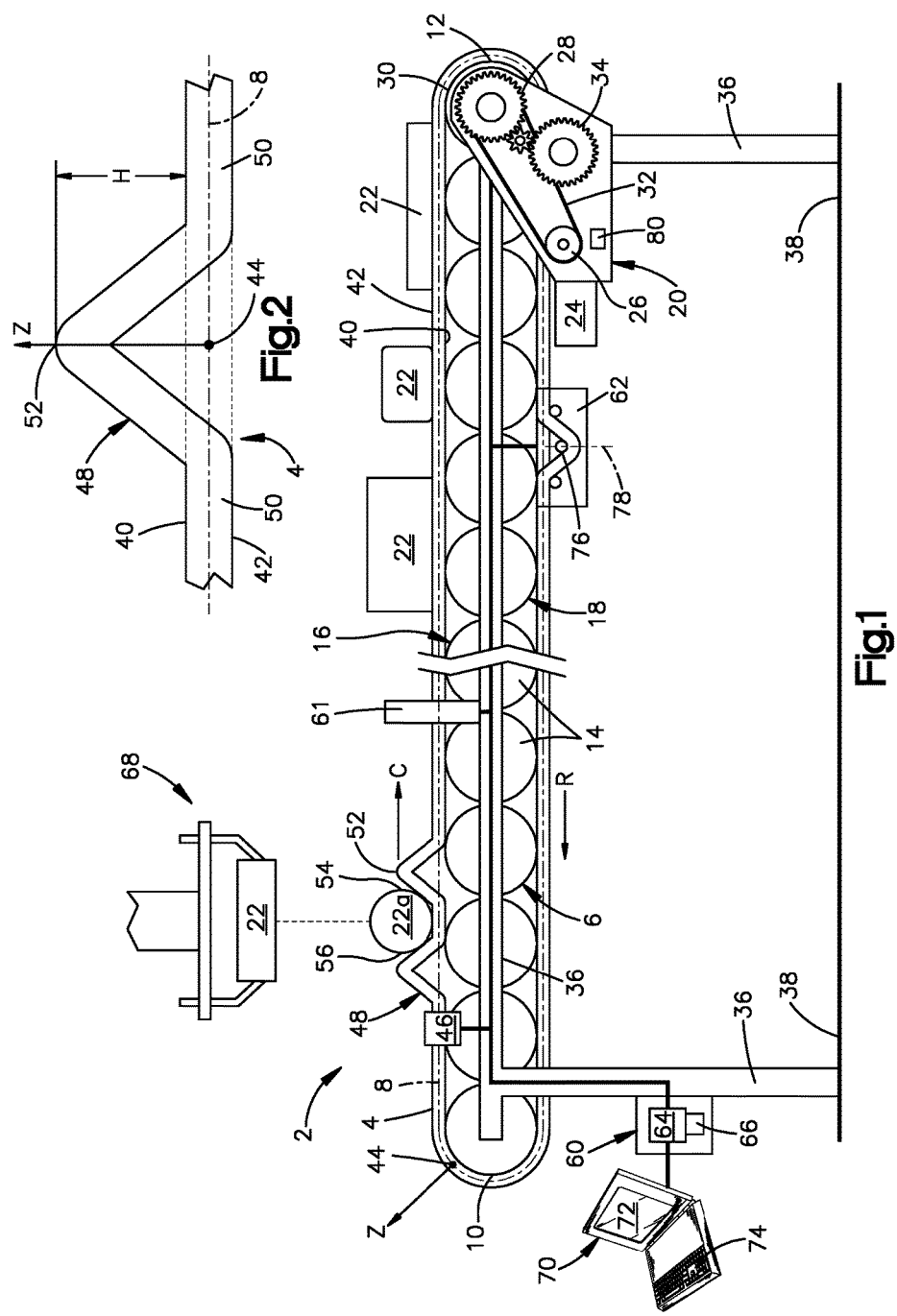

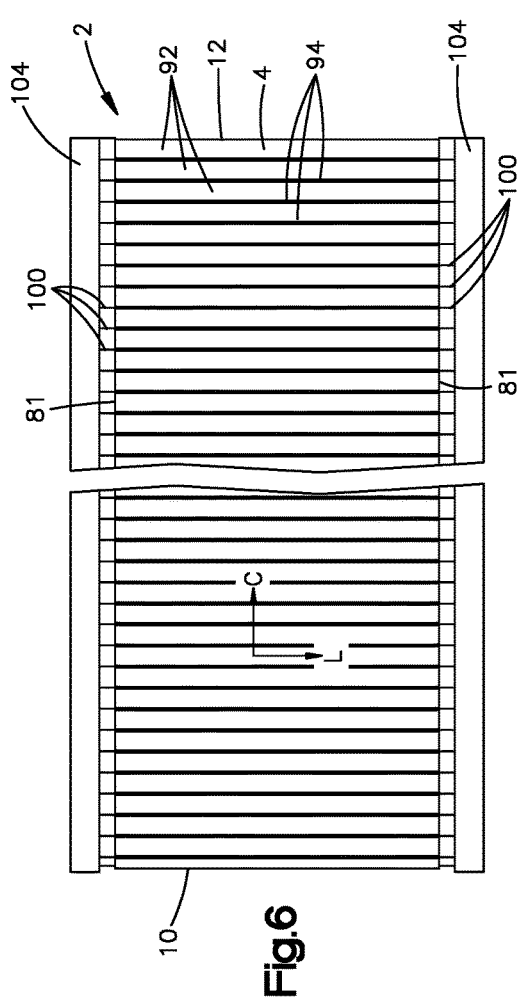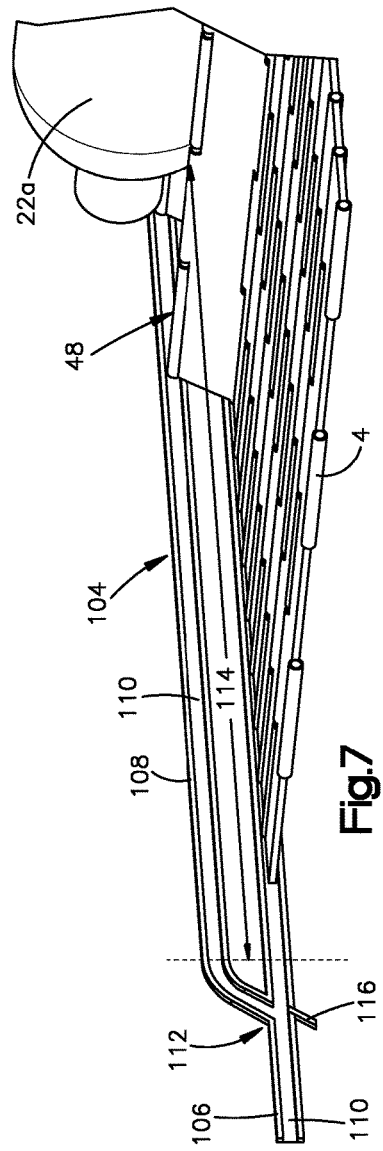

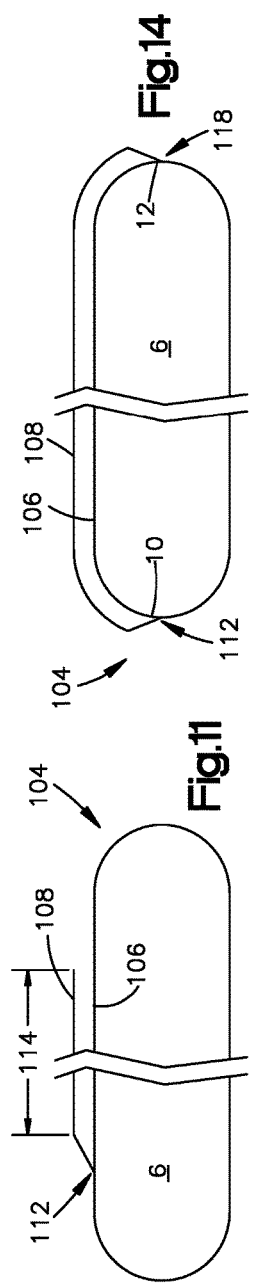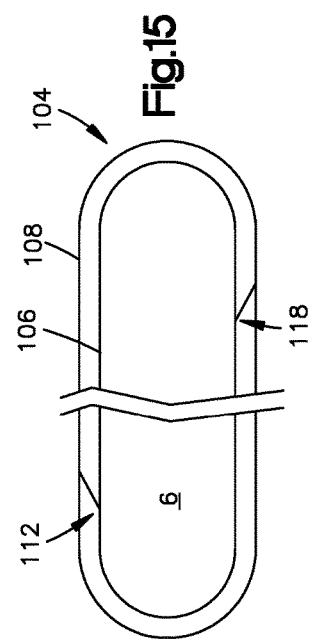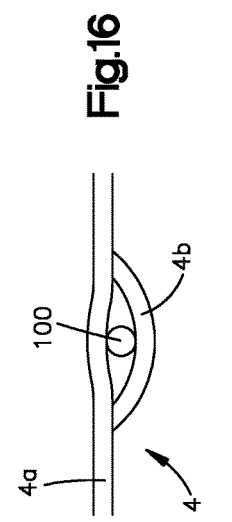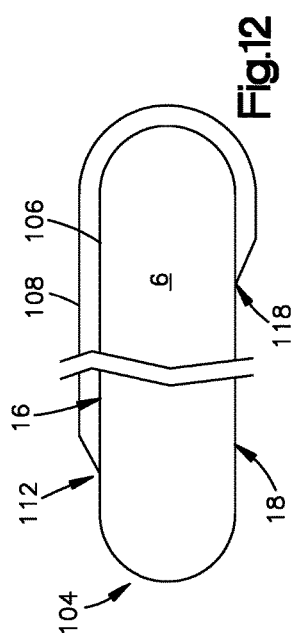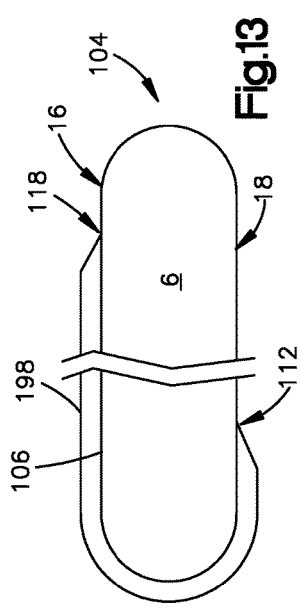

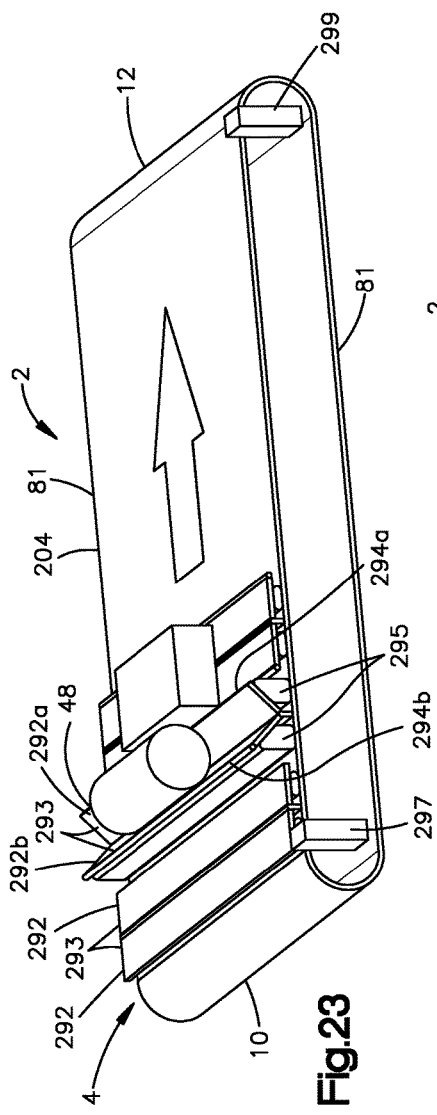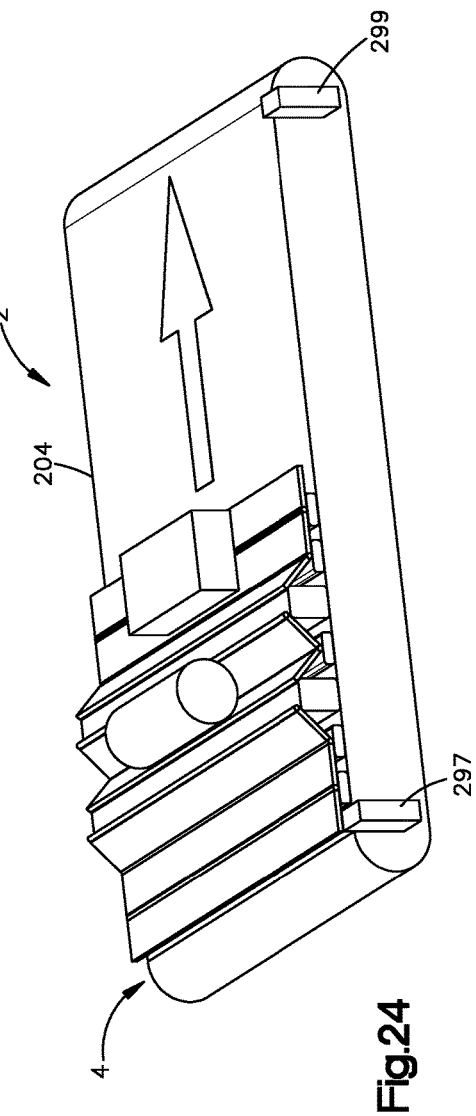

ON-DEMAND V-SHAPED CONVEYOR

BACKGROUND

In a materials handling facility, such as an order fulfillment center, multiple customer orders are received, where each order specifies one or more items from inventory to be shipped to the customer that submitted the order. To fulfill the customer orders, the one or more items specified in each order may be retrieved, or picked, from inventory (which may also be referred to as stock storage) in the materials handling facility. Under direction of a control system, picked items may be singulated and then inducted into a conveyance mechanism that routes the items to particular destinations, such as sorting stations, in accordance with the customer orders currently being processed. From the sorting station, the items can be directed to an order processing station, such as a packing station at which one or more units of items for an order are processed, packed, and labeled for shipping to the customer.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 1 shows a schematic view of a conveyor employing a belt for conveying objects, according to an embodiment of the present disclosure, wherein the belt is configured to define outwardly extending peaks;

FIG. 2 shows an enlarged view of a portion of the belt of FIG. 1;

FIG. 6 shows a top plan view of a conveyor employing the belt of FIG. 5 between a pair of side tracks;

FIG. 7 shows a partial perspective view of a side track as shown in FIG. 6;

FIGS. 11 through 15 show schematic, partial side views of various side track configurations, according to additional embodiments of the present disclosure;

FIG. 16 shows a partial side view of a portion of a belt having an elastic main portion, according to another embodiment of the present disclosure;

FIG. 23 shows a partial perspective view of a conveyor employing inflatable airbags, according to another embodiment of the present disclosure; and FIG. 24 shows a partial perspective view of an alternative arrangement of the conveyor of FIG. 23.

DETAILED DESCRIPTION

Figure 3:
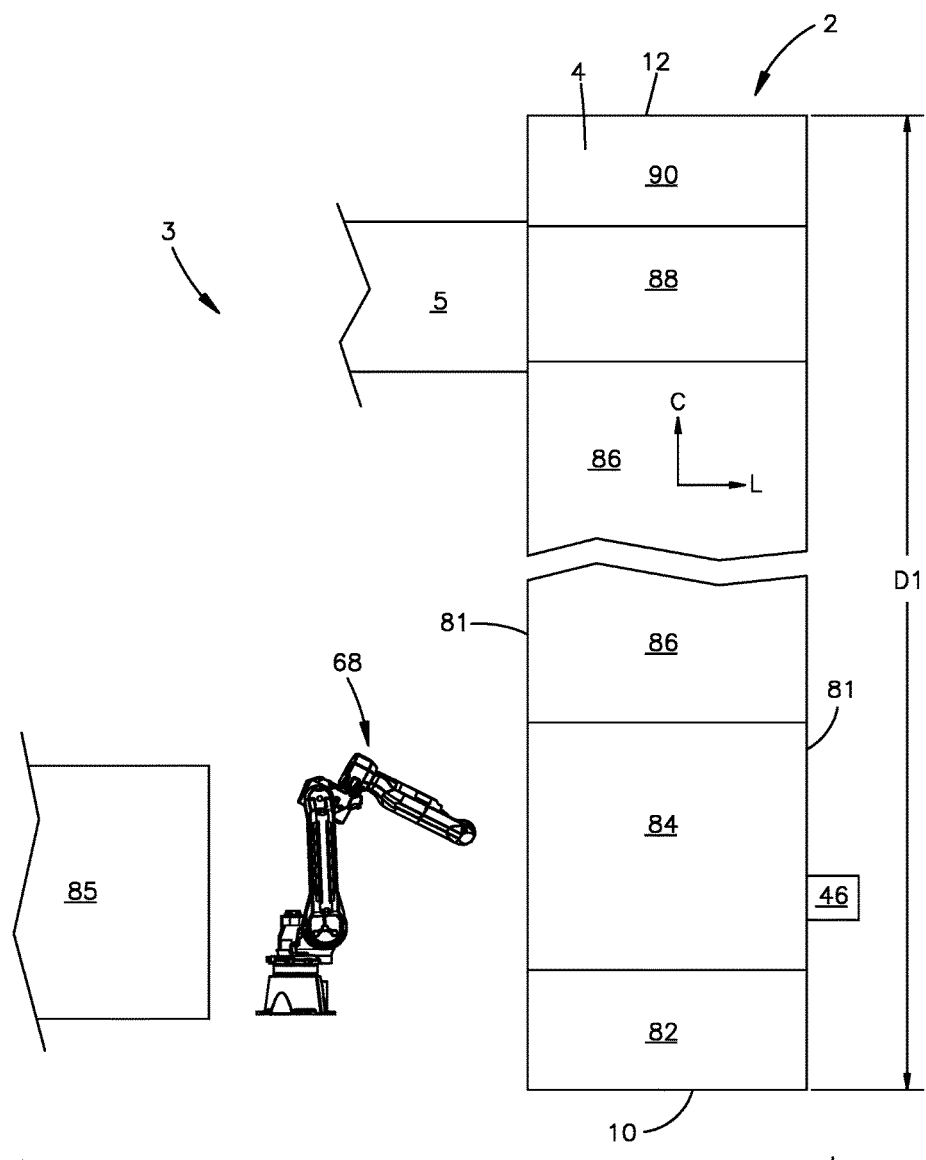
FIG. 3 in shows a top plan view of the conveyor of FIG. 1 employed in a conveyor system.

In a fulfillment center, the same conveyor often needs to be able to transport objects of widely varying sizes and shapes. Objects with flat surfaces or even straight edges typically maintain their relative position on a conveyor belt while being transported thereon. However, cylindrical or otherwise curved or round objects can have a tendency to roll along the conveyor so as to be out of their expected position on the conveyor. Such objects may be placed in a bin, tote, or tray on the belt so maintain the round object in its position on the belt. However, the added step of placing the object in such a container decreases the efficiency at which the conveyor transports objects. The need to maintain a supply of such containers at the conveyor also increases the cost of operating the conveyor. The present disclosure pertains to conveyors that are able to selectively change the shape of their belts as needed which, in a preferred embodiment, prevents cylindrical or otherwise round objects conveyed thereon from rolling with respect to the belt. Such conveyors can also be employed to effectively create "dividers" along the belt for purposes of separating objects of different customer orders along the belt.

Referring to FIG. 1, a conveyor 2 can include a belt 4 disposed around a roller assembly 6 along a belt axis 8. The roller assembly can define a proximal end 10, a distal end 12 spaced from the proximal end in a direction of conveyance C, and a plurality of rollers 14 positioned between the proximal and distal ends 10, 12. The conveyor 2 is configured so that the belt 4 moves in the direction of conveyance C along a top side 16 of the roller assembly 6 and moves in a return direction R (opposite the direction of conveyance C) on an underside 18 of the roller assembly 6. At the proximal end 10 of the conveyor 2, the belt 4 transitions from moving in the return direction R to moving in the direction of conveyance C. At the distal 12 end of the conveyor 2, the belt 4 transitions from moving in the direction of conveyance C to moving in the return direction R.

The conveyor 2 includes a drive mechanism 20 configured to cause the belt 4 to convey objects 22 along the roller assembly in the direction of conveyance C. The drive mechanism 20 can include a motor 24 that drives a drive shaft 26 that in turn drives a flywheel 28 coupled to a drive roller 30 of the plurality of rollers 14. As shown, the drive roller 30 can be coupled to the motor 24 by a drive belt 32; however, it is to be appreciated that other types of drive mechanisms configured to drive the belt 4 are within the scope of the present disclosure. The drive roller 30 can be coupled to an encoder 34, such as a rotary encoder, for example, that is configured to record the rotational position of the drive roller 30. The encoder 34 can be an absolute encoder or an incremental encoder. The conveyor 2 can include a support frame 36 that carries each of the rollers 14 and positions the rollers 14 so as to define the direction of conveyance C. In a fulfillment center, the support frame 36 can be mounted to the facility floor 38, although other mounts, such as a ceiling-mounted and wall-mounted conveyors, are within the scope of the present disclosure.

The belt 4 can be a single, continuous band of material, as shown in FIG. 1, or can comprise a plurality of belt segments of links coupled together at belt joints, as discussed below. The belt 4 can define an inner belt surface 40 that is in contact with at least some of the rollers 14 and an outer belt surface 42 configured to support the objects 22 to be conveyed. At each reference location 44 of the belt 4 along the belt axis, the outer belt surface 42 is spaced from the inner belt surface 40 along a direction Z that is orthogonal to the belt axis 8 at that reference location. Thus, the foregoing direction is referred to herein as the "orthogonal belt direction Z," and it is to be appreciated that the orthogonal belt direction Z varies as the reference location 44 moves along the belt axis 8.

The conveyor 2 can include an actuator 46 that is in communication with the belt 4 and is configured to cause the belt 4 to change its shape in various ways to enhance the conveyance of objects 22 thereby. For example, as shown, the actuator 46 can cause portions of the belt 4 to define peaks 48 that protrude outwardly from a primary portion 50 of the belt 4 that remains in contact with at least some of the rollers 14. An enlarged view of peak 48 extending outwardly from the primary portion 50 of the belt 4 is shown in FIG. 2. It is to be appreciated that the belt axis 8 extends through the primary portion 50 of the belt 4, such that the peaks 48 deviate from the belt axis 8. The peaks 48 define an apex 52 and a peak height H, measured from the apex 52 to the underlying belt axis 8 along the orthogonal belt direction Z. As shown, peaks 48 can be formed in the belt 4 on a leading side 54 and a trailing side 56 of an object 22 with respect to the direction of conveyance C. Thus, the belt 4 can define peaks 48 that prevent cylindrical or otherwise round objects 22a from rolling or shifting along the belt 4. The peaks 48 can define a peak height H in a range of about 0.25 inch and about 3.0 inches. In other embodiments, the peak height H can be in a range of about 1.0 inch and about 1.5 inches. In further embodiments, the peak height H can be about 1.25 inches. In yet further embodiments, the peak height H can be less than 0.25 inches or greater than 3.0 inches. Additionally, the conveyor 2 can be scaled larger or smaller as desired. Through numerous tests, the inventors have discovered that a peak height H of about 1.25 inches is sufficient to prevent rolling of the vast majority of round objects processed in a fulfillment center. In this manner, the relative position of such round objects 22a on the belt 4 can be precisely controlled. It is also to be appreciated that the peaks 48 can also be employed to form dividers in the belt 4 so that objects 22 of the same customer order can be placed between adjacent dividers, eliminating the need for bins or totes to be placed on the belt 4 for grouping objects of the same customer order together. In other embodiments, a peak 48 can be temporarily formed in the belt 4 between adjacent or abutting objects 22 on the conveyor 2 to create space between the objects 22, such as for singulation purposes, for example.

The conveyor 2 can include a control unit 60 in communication with the drive mechanism 20 and the actuator 46. The control unit 60 can also be in communication with one or more sensors 61 for detecting the presence and/or position of objects 22, 22a on the belt 4. The one or more sensors 61 can also detect the presence and position of peaks 48 in the belt 4. The one or more sensors 61 can be optical sensors, proximity sensors, laser scanners, or any other type of sensor capable of detecting the presence and/or position of objects 22, 22a and/or peaks 48. The belt 4 can also have markings on the sides thereof, which markings can be detected by the one or more sensors 61 when the markings are elevated by a peak 48. The control unit 60 can also be in communication with a tension adjustment mechanism 62, also referred to herein as a "tensioner," that engages the belt 4 and is configured to maintain the belt 4 at a predetermined level of tension. The control unit 60 can be configured to send one or more peak command signals to the actuator 46 to cause the actuator 46 to form one or more peaks 48 in the belt 4. The peak command signals can be transmitted autonomously by the control unit 60. The control unit 60 can include a processor 64 in communication with computer memory 66.

In one non-limiting example of a fully autonomous embodiment, the processor 64 receives data pertaining to the shape and dimensions (i.e., size) of objects 22 queued for induction onto the belt 4. Such data is referred to herein as "object data." The object data can be obtained by an image sensor of the one or more sensors 61. For example, an image sensor 61, such as a camera or a CMOS image sensor, can transmit images of each object 22 on the conveyor 2 to the processor 64, which can execute image recognition algorithms to obtain the object data, which can include the curvature of round portions of the objects 22. The image sensor 61 can be a 2-dimensional (2D) or 3-dimensional (3D) image sensor. In other embodiments, the one or more sensors 61 can include a scanner, such as a laser scanner or image scanner, that is configured to scan a barcode or other type of identification tag placed on the objects 22. The processor 64 can be configured to associate the identification data for each object 22 with the corresponding object data (including the identification of any curvature thereof) stored in the computer memory 66 or optionally accessible on one or more remote servers in communication with the processor 64.

The objects 22 can be placed on the belt by a placement mechanism 68. The placement mechanism 68 can be a gripping arm, as shown; however, in other embodiments the placement mechanism 68 can be a shuttle, or another conveyor belt that offloads objects onto the conveyor 2, or any other type of placement mechanism 68. When the processor 64 identifies that a round object 22a is queued for induction on the conveyor 2, the processor 64 can execute software that performs one or more algorithms with the respective object data so as to determine the spacing between adjacent peaks 48 to accommodate the object 22a. Based on the determined spacing, the processor 64 sends a first peak command signal to the actuator 46, which causes a first peak 48 to be formed in the belt 4. The processor 64 also sends a second command signal to the actuator 46, which causes a subsequent peak 48 to be formed in the belt 4 at the determined spacing. The first and second command signals can be sent concurrently or separately. Once the peaks 48 are formed, the placement mechanism 68 then places the round object 22a on the belt 4 between the peaks 48. It is to be appreciated that various aspects of the foregoing autonomous peak-forming embodiment can be adjusted as desired. For example, the processor 64 can send the peak command signals after a round object 22a is placed on the conveyor 2, such as responsive to object data obtained, at least in part, from the one or more sensors 61.

In other embodiments, the peak-forming process can be controlled by a human operator. Accordingly, the control unit 60 can be in communication with an operator kiosk 70, which can include a display 72 for presenting information to the operator, and inputs 74, such as buttons, allowing the operator to affect operation of the conveyor 2. It is to be appreciated that, in some embodiments, the display 72 can be a touchscreen display, and the inputs 74 can be incorporated into the touch screen.

In one non-limiting example of a human-operated embodiment, the kiosk 70 is configured such that, when the operator determines that a peak 48 is desired in the belt 4, such as when a round object 22a is queued in the placement mechanism 68, the operator can push an input button 74, which sends a first peak command signal to the actuator 46, which in turn causes a first peak to be formed in the belt 4 (in this example, while the belt 4 is being driven). The round object 22a is then placed on the belt 4 so that the first peak 48 is on the leading side 54 of the object 22a. During the foregoing placement phase, the operator can "hold" the button 74 for a duration, and once the object 22a is placed on the belt 4, the operator can release the button 74, which causes the control unit 60 to send a second peak command signal to the actuator 46, causing the actuator 46 to form a second peak 48 in the belt 4 on the trailing side 56 of the object 22a. In other human-operated embodiments, the kiosk 70 and the control unit 60 can be configured so that the operator pushes the button 74 to form the first peak 48 and pushes the button 74 a second time to form the second peak 48. The inputs 74 of the kiosk 70 can also be configured to allow the operator to control the drive mechanism 20 to manipulate the belt speed, and stop and start the belt (if necessary). The inputs 74 can also allow the operator to control the placement mechanism 68 as needed. It is to be appreciated that the placement mechanism 68 can be omitted and the placement step can optionally be manually performed by the human operator. It is also to be appreciated that the kiosk 70 can be employed in fully autonomous embodiments, such as to monitor operation of the conveyor 2.

It is to be appreciated that, in embodiments where the belt 4 is substantially inelastic, the effective total length of the belt 4 decreases with each peak 48 that is formed in the belt 4, increasing the tension on the belt 4. Thus, along with the peak command signals, the control unit 60 can also send correlated tension command signals to the tensioner 62 to cause the tensioner 62 to reduce the tension on the belt 4 so that the predetermined level of tension is substantially maintained regardless of the number of peaks 48 formed in the belt 4. In one example embodiment, the tensioner 62 can include an adjustment roller 76 that is movable along a movement axis 78 so as to adjust the level of tension in the belt 4. It is to be appreciated that other types of tension adjustment mechanisms are within the scope of the present disclosure.

The control unit 60 can also be in communication with the drive mechanism 20 in a manner allowing the control unit 60 to precisely track the position of each peak 48 along the roller assembly 6. For example, the drive mechanism 20 can include a sensor 80 for generating data pertaining to the rotational speed of the drive shaft 26 (i.e., "rotational speed data") and transmitting the rotational speed data to the control unit 60. The encoder 34 can also generate data pertaining to the angular position of the encoder 34 (i.e., "angular position data") and transmit the angular position data to the control unit 60. When a peak command signal is sent to the actuator 46, the processor 64 can log the event in the computer memory 66, and can also log therewith the angular position of the encoder 34 at the occurrence of the event based on the angular position data received from the encoder 34. The processor 64 can be configured execute software that performs one or more algorithms with the rotational speed data and the angular position data to extrapolate the precise location of each peak 48 on the belt 4.

Referring now to FIG. 3, a top plan view of a conveyor system 3 employing the conveyor 2 of FIG. 1 is shown, illustrating various operational regions of the conveyor 2. The belt 4 can define opposed lateral sides 81 spaced from each other in a lateral direction L that is substantially perpendicular to the direction of conveyance C. The conveyor 2 can define a peak-building region 82 in which the peaks 48 are formed in the belt 4. Accordingly, the actuator 46 (not shown in FIG. 2) can be located in the peak-building region 82. In the illustrated embodiment, the peak-building region 82 is adjacent the proximal end 10 of the roller assembly 6. The conveyor 2 can define an object induction region 84 downstream of the peak-building region 82 with respect to the direction of conveyance C. Accordingly, the placement mechanism 68, depicted as a robotic arm in FIG. 2, can be located adjacent the object induction region 84. The placement mechanism 68 can transfer objects 22 from a source 85 of objects, such as a bin, tray, tote, storage wall, or another conveyor.

The conveyor 2 can define a transport region 86 downstream 86 of the object induction region 84, and an object destination region 88 downstream of the transport region 86. At the object destination region 88, the exiting the transport region 86 can be offloaded from the conveyor 2. The objects 22 can be offloaded from the object destination region 88 by an autonomous object removal mechanism, such as another robotic arm or even a divider extending across the object destination region 88 so as to direct the objects 22 onto a shuttle or, as shown, another conveyor 5. In other embodiments, a human operator can manually remove the objects 22 from the object destination region 88. The conveyor 2 can also define a peak-leveling region 90 downstream of the object destination region 88 with respect to the direction of conveyance C. At the peak-leveling region 90, any peaks 48 in the belt 48 can be flattened or otherwise returned to the primary portion 50 of the belt 4. The conveyor 2 can define a total length D1 along the direction of conveyance C. The total length D1 can be in a range between about 18 inches and about one half of a mile (i.e., about 2,640 feet). It is to be appreciated that a plurality of conveyors 2 configured as described herein can be placed in series with one another to form a conveyor system 3. It is also to be appreciated that while the conveyor 2 is depicted herein as being substantially straight (i.e., defining a substantially linear direction of conveyance C), the conveyors 2 can be configured such that the direction of conveyance C changes along the belt 4, and can include angled segments and curvilinear segments.

The peak-building region 82 can be located on the top side 16 of the roller assembly 6. In other embodiments, however, the peak-building region 82 can be located on the underside 18 of the roller assembly 6. In further embodiments, the peak-building region 82 can be located at the proximal end 10 of the roller assembly 6 and between the top side 16 and the underside 18. Similarly, the peak-leveling region 90 can be located on the top side 16, the underside 18, or at the distal end 12 of the conveyor 2 between the top side 16 and the underside 18 thereof.

Figure 4:
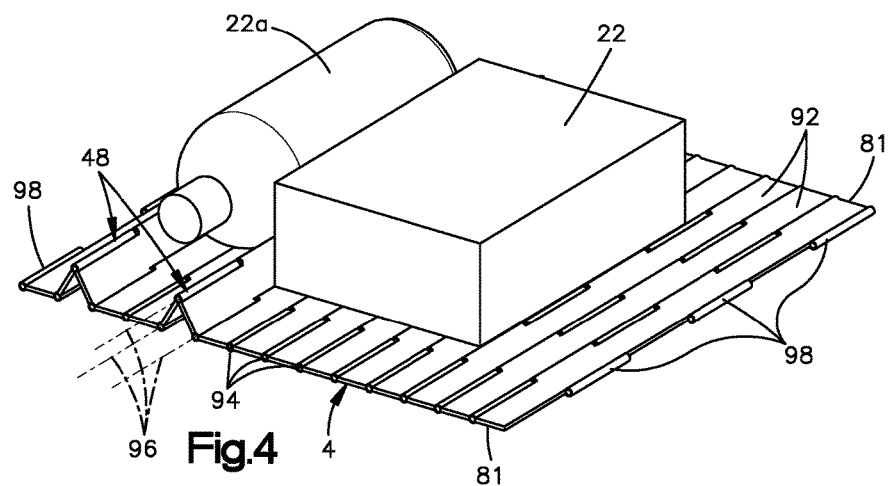
FIG. 4 shows a perspective view of a portion of a belt configured to be employed with the conveyor of FIG. 1, according to an embodiment of the present disclosure.
Figure 5:
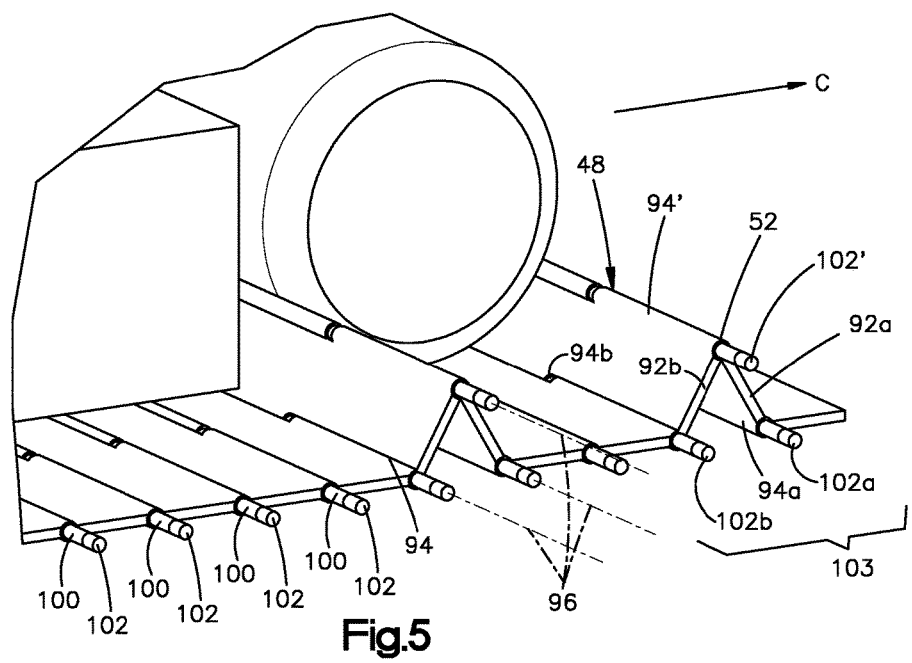
FIG. 5 shows a partial perspective view of another embodiment of the belt shown in FIG. 4.

Referring now to FIGS. 4 and 5, the belt 4 is shown according to one example embodiment of the present disclosure. The belt 4 can include a plurality of links 92 coupled together end-to-end along the belt axis 8 at joints 94. The links 92 can be substantially rigid slats that are elongated along the lateral direction L and coupled end-to-end along the belt axis 8. As shown, each of the slats can extend from one lateral side 81 of the belt 4 to the other lateral side 81. However, in other embodiments, each link 94 can include two or more slats coupled side-by-side along the lateral direction L.

The joints 94 can be elongated along the lateral direction L and can each define a joint axis 96 oriented along the lateral direction L. Each joint 94 can be at least partially defined by a plurality of intermeshing, laterally elongated joint segments 98 of the adjacent links 92. Each joint 94 can include a pin 100 extending along the joint axis 96. At least some of the joints 94 can be revolute joints (also referred to as "hinge joints" or a "pin joints"), whereby the adjoined links 92 are pivotable about the joint axis 96 so as to define a peak 48 in the belt 4. The pins 100 can extend laterally outward from the joints 94. At least some of the pins 100 can include followers 102 positioned at the outward ends thereof. The followers 102 can be configured to follow guide features of the conveyor 2. As shown in representative region 103 of FIG. 5, one of the followers 102 can be guided upward from an adjacent leading follower 102a and an adjacent trailing follower 102b so as to define an apex 52 of a peak 48 (thus, during this process, the follower 102 can be termed an "apex follower" 102). As the apex follower 102 is guided upward, a leading link 92a that shares the joint 94 with the apex follower 102 pivots upwards about its leading joint 94a while the respective trailing link 92b pivots upwards about its trailing joint 94b so that the leading and trailing links 92a,b define the peak 48, with the shared joint 94 (and its follower 102) at the apex 52.

Referring now to FIG. 6, the guide features can include a pair of side tracks 104 extending alongside the belt 4 such that the belt 4 is positioned laterally between the side tracks 104. The side tracks 104 can extend from the proximal end 10 to the distal end 12 of the roller assembly 6. In the illustrated embodiment, the pins 100 extend from the lateral sides 81 of the belt 4 so that the followers 102 ride in slots 110 in the side tracks 104. The followers 102 can be bearings, wheels, pins, or any other feature configured to ride along the side tracks 104 in a guided manner.

Referring now to FIG. 7, one of the side tracks 104 is shown according to an embodiment that employs the followers 102 of FIG. 6. It is to be appreciated that the other side track 104, although not visible in FIG. 7, is substantially a mirror image of the visible side track 104 about a vertical plane extending along the direction of conveyance C along a lateral midline of the belt 4. Each of the pair of side tracks 104 includes a primary track 106 and a secondary or outer track 108. In the illustrated embodiment, the primary track 106 traverses substantially an entirety of the belt axis 8. The primary track 106 and the outer track 108 can each define respective slots 110 into which the followers 102 of the belt 4 can extend. The followers 102 can be configured to ride along the slots 110 of either the primary track 106 or of the outer track 108 as determined by the control unit 60. When a follower 102 of the belt 4 rides along the primary track 106, the leading and trailing links 92 associated with the follower 102 remain in contact with the rollers 14 of the roller assembly 6 and define the primary portion 50 of the belt 4. When a follower 102 rides along the outer track 108, the leading and trailing links 92a,b associated with the follower 102 pivot upwards to define the peak 48, as set forth above with reference to FIG. 5. The outer track 108 can intersect the primary track 106 at a switchpoint 112 located in the peak-building region 82 of the conveyor 2. Downstream of the switchpoint 112, each side track 104 can define a parallel region 114 in which the primary track 106 and the outer track 108 extend parallel to one another. In the parallel region 114, the outer track 108 can be spaced from the primary track 106 by a distance D2 along the orthogonal belt direction Z, wherein the distance D2 is substantially equivalent to, or at least determines, the peak height H. The distance D2 preferably remains constant throughout the parallel region 114. The parallel region 114 of the side tracks 104 can traverse the transport region 86 of the conveyor 2 and can extend at least to the object destination region 88 of the conveyor 2.

Figure 8:
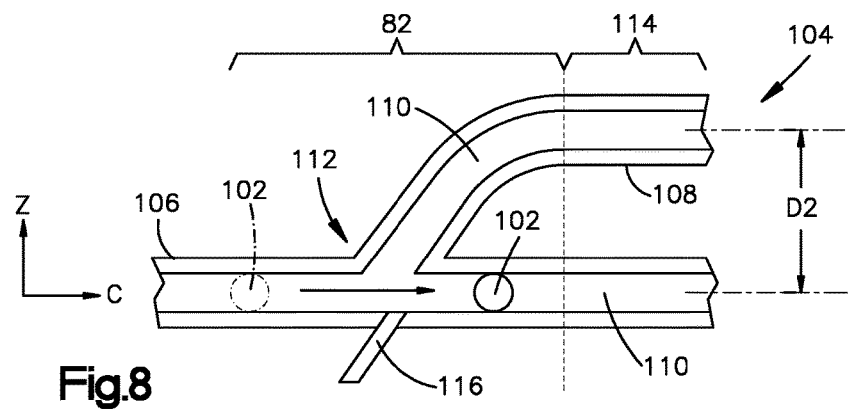
FIG. 8 shows a side view of a portion of a side track shown in FIG. 7 in a first configuration.
Figure 9:
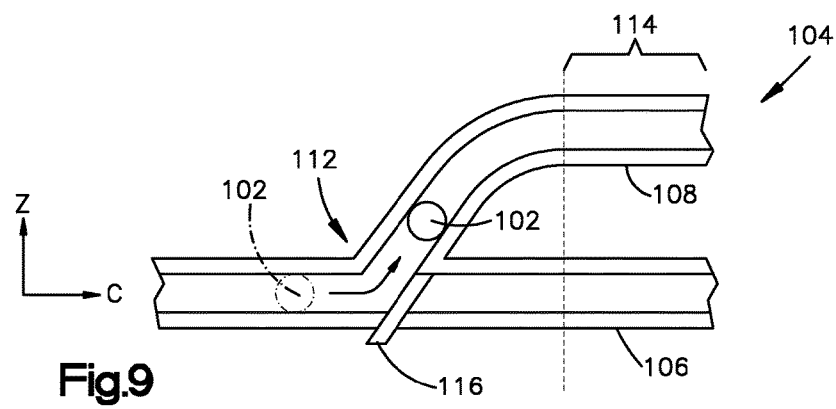
FIG. 9 shows a side view of a the portion of the side track shown in FIG. 7 in a second configuration.
Figure 10:
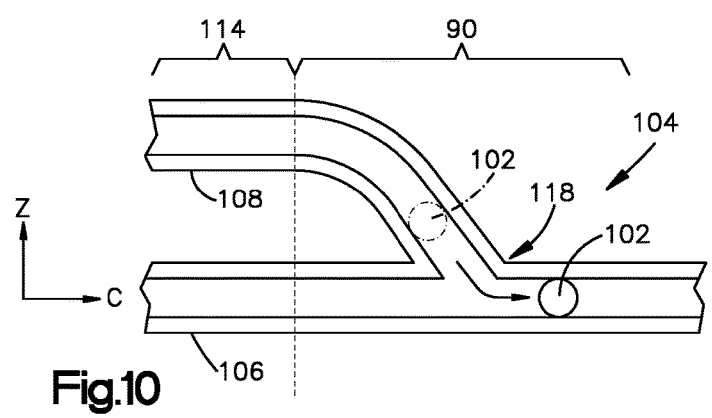
FIG. 10 shows a side view of a another portion of the side track.

Referring now to FIGS. 8 and 9, the conveyor 2 can include a movable switch 116 that is located at the switchpoint 112 and is in communication with the actuator 46. The actuator 46 is configured to move the switch 116, responsive to receiving the peak command signal from the control unit 60, from an open position, as shown in FIG. 8, to a closed position, as shown in FIG. 9. When the switch 116 is in the open position, the followers 102 of the belt 4 enter and exit the switch point 106 undeterred along the primary track 106. When the switch 116 is in the closed position, a follower 102 entering the switchpoint 112 is diverted to the outer track 108 so as to form a peak 48 in the belt 4. As shown in FIG. 10, the outer track 108 can converge with the primary track 106 at a return point 118 that is downstream of the parallel region 114 of the tracks and within the peak-leveling region 90 of the conveyor 2. At the return point 118, any followers 102 riding along the outer track 108 are guided back to the primary track 106, causing the associated peaks 48 to be leveled or otherwise returned to the primary portion of the belt 4.

Referring now to FIGS. 11 through 15, plan views of various additional side track 104 configurations are shown.

As shown in FIG. 11, the outer track 108 can terminate at a distal end of the parallel region 114, and the tension in the belt 48 can effectively pull any followers 102 exiting the outer track 108 back to the primary track 106. In embodiments where the followers 102 ride within slots 110 defined by the tracks, the primary tracks 106 can each define an acceptance feature (not shown), such as an external opening in communication with the slot 110, through which the followers 102 can return to the slots 110 of the primary tracks 106.

As shown in FIG. 12, the return point 118 can be located on the underside 18 of the roller assembly 6. As shown in FIG. 13, the switchpoint 112 can be located on the underside 18 of the roller assembly 6. As shown in FIG. 14, the switchpoint 112 and the return point 118 can be located at the proximal end distal ends 10, 12, respectively, of the roller assembly 6. As shown in FIG. 15, the outer track 108 can extend entirely around the roller assembly 6. In the embodiment of FIG. 15, the conveyor 2 can be configured to maintain an equal number of peaks 48 on the top side 16 and the underside 18 of the roller assembly 6 so as to maintain a predetermined level of tension on the belt 4, as well as maintaining the effective total length of the belt 4. It is to be appreciated that, in such embodiments, the peaks 48 themselves can be effectively employed as a tensioning mechanism, wherein the belt tension is determined by the number of peaks 48 formed in the belt 4. In similar embodiments, the conveyor 2 can include one or more additional actuators 46 on the underside 18 of the roller assembly 6 for forming a peak 48 on the underside 18 for each peak 48 on the topside 16, thus maintaining the belt at a predetermined level of tension. It is to be appreciated that, in the embodiments set forth above with reference to FIGS. 5 through 15, the belt 4 can alternatively be driven by a drive mechanism that rides along the side tracks.

It is to be appreciated that, in another embodiment, the belt 4 can be generally similar to that disclosed above with reference to FIGS. 4 through 10, and can include a plurality of links 92 coupled together at joints 94 that carry followers 102 configured to ride along the side tracks 104 extending alongside the belt 4. The links 92, however, instead of being rigid slats, can be elastic, so that when a follower 102 is diverted to the outer track 108, the pin 100 can stretch the leading and trailing links 92*a,b* outward from the belt axis 8 to form the peak 48 in the belt 4. In such embodiments, the elasticity of the links 92 can be predetermined such that, when a peak 48 is formed, a distance between the links 92 leading and trailing those that form the peak 48 remains substantially constant. In such embodiments, the tensioner 62 need not adjust the belt tension each time a peak 48 is formed. In further embodiments employing an elastic belt 4, the belt 4 can extend monolithically along the belt axis 8, and can be formed of an elastic material with pins 100 and or followers 102 embedded therein so as to define belt segments therebetween, and can otherwise be configured as set forth above. In additional embodiments, as shown in FIG. 16, the belt 4 can include a main belt portion 4*a* that extends continuously around the roller assembly 6, and the pins 100 can be disposed between the main belt portion 4*a* and connecting strips 4*b* that are sewn or otherwise attached to the main belt portion 4*a*.

Referring now to FIGS. 17 through 22, an alternative peak-forming actuator 146 is shown according to another embodiment of the present disclosure. In this embodiment, the belt 4 can be generally similar to that disclosed above with reference to FIGS. 4 through 10, and can include a plurality of rigid links 92 coupled together at joints 94 that define joint axes 96 about which the links 92 can pivot to form a peak 48. Moreover, each joint 94 can be at least partially defined by intermeshing, laterally elongated joint segments 98 of the adjacent links 92. However, in the present embodiment, the followers 102 and side tracks 104 are omitted, and the joints 94 instead include locking features, as set forth below.

Figure 17:
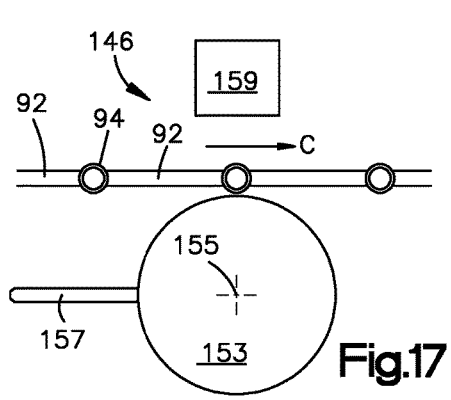
FIG. 17 shows a schematic view of an actuator for causing peaks to be formed in the belt, according to another embodiment of the present disclosure.
Figure 18:
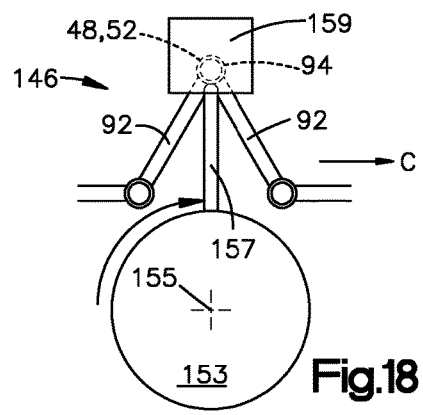
FIG. 18 shows a schematic view of the actuator of FIG. 17 in a subsequent position.

As shown in FIGS. 17 and 18, the actuator 146 can include a cam 153 defining an axis of rotation 155 and an arm 157, such that the cam 153 is selectively rotatable about its axis 155 (such as when the actuator 146 receives a peak command signal from the control unit 60). Actuation of the cam 153 can be synchronized with the belt 4 (for example, by a synchronization gear assembly) such that, when a peak command signal is received, the cam 153 rotates 90 degrees forwardly with respect to the direction of conveyance C so that the arm 157 pushes a joint 94 outward, whereby the joint 94 defines an apex 52 of a peak 48. The arm 157 is sized such that the joint 94 at the newly formed apex 52 passes a lock inducer, such as a magnet 159.

Figure 19:
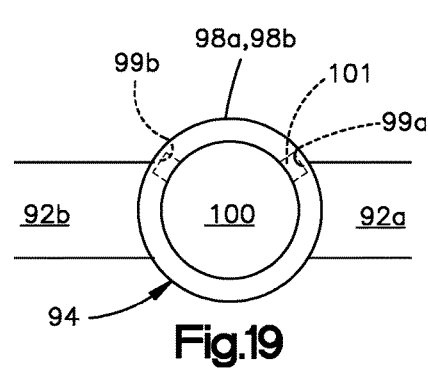
FIG. 19 shows a side view of a joint in the belt of FIG. 17.
Figure 20:
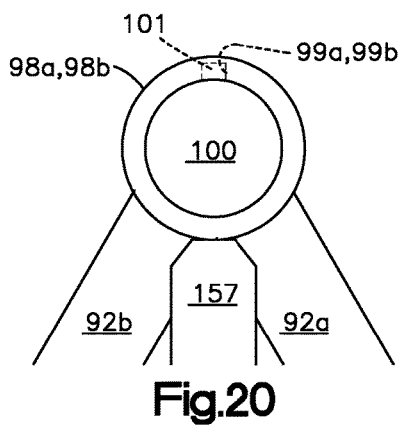
FIG. 20 shows a side view of the joint of FIG. 19 in a subsequent orientation.
Figure 21:
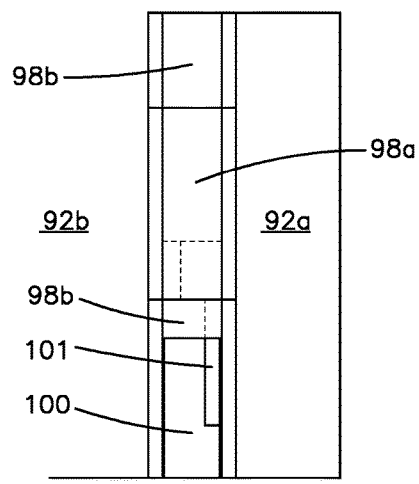
FIG. 21 shows a top, partial schematic view of the joint in the orientation shown in FIG. 19.
Figure 22:
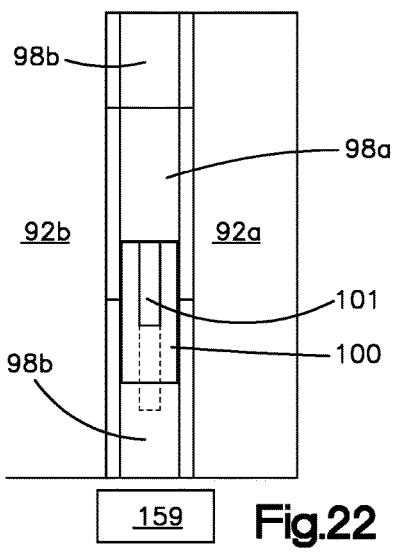
FIG. 22 shows a top, partial schematic view of the joint in the orientation shown in FIG. 20.

Referring now to FIGS. 19 through 22, at the joint 94, the intermeshing joint segments 98*a,b* of the respective leading and trailing links 92*a,b* each defines a key slot 99*a,b*. The pin 100 in the joint 94 can define a key protrusion 101 that is disposed within the key slot 99*b* of the laterally outermost joint segment 98*b*. As shown in FIGS. 19 and 21, when the links 92*a,b* extend along the belt axis 8, the key slots 99*a,b* are offset. As shown in FIGS. 20 and 22, when the links 92*a,b* pivot to form a peak 48, the key slots 99*a,b* become aligned with each other. The cam 153 and the magnet 159 can be configured such that the cam arm 157 causes the joint 94 to pass alongside the magnet 159 when the key slots 99*a,b* are aligned. The inner end of the magnet 94 and the pin 100 have the same magnetic polarity so that the magnet 159 pushes the pin 100 inward so that the key protrusion 101 extends within both key slots 99*a,b*, locking the links 92*a,b* together in the peak 48 configuration. The links 92*a,b* preferably remain locked in the peak configuration until the peak 48 engages an unlocking feature, such as a second magnet that has a polarity opposite that of the pin 100 so as to return the pin 100 to the unlocked position.

Referring now to FIG. 23, a conveyor 2 according to another embodiment is shown. In this embodiment, the belt 4 can include an inner belt 204 that is driven along a roller assembly in a manner similar to that set forth above with reference to FIG. 1. In the present embodiment, the belt 4 can include a plurality of rigid belt slats 292 extending laterally between the lateral sides 81 of the belt 4. The slats 292 can be arranged in slat pairs 293, such that a leading slat 292*a* and a trailing slat 292*b* of each pair 293 are pivotable upward about a shared joint 294. A leading end 294*a* of the leading slat 292*a* and a trailing end 294*b* of the trailing slat 292*b* of each pair 293 can be "free" ends. Underlying each slat 292 is an inflatable compartment, such as an airbag 295. For illustrative purposes, only a portion of the slats 292 and airbags 295 are shown in FIG. 23.

An actuator, such as an inflation device 297, is positioned alongside the belt 4 at a peak-building region (preferably near the proximal end 10 of the conveyor 2) and a deflation device 297 is positioned alongside the belt 4 at the peak-leveling region (preferably near the proximal end 12 of the conveyor 2). The inflation device 297 can be in communication with a source of actuation fluid, such as compressed air. When an airbag 295 is uninflated, the overlaying slat 292 extends parallel with the underlying inner belt 204. When a peak 48 is desired, the inflation device 297 can sealingly couple with the adjacent airbag 295 and inject pressurized air therein, pivoting the overlaying slat 292 upwards about the shared joint 294. The deflation device 299 can be configured to release the pressurized air from the inflated airbag 295 when the airbag 295 passes the deflation device 299.

Referring now to FIG. 24, in another embodiment, which is similar to that shown in FIG. 23, the airbags 295 can be modified so that each airbag 295 underlies both free ends 294*a,b* of adjacent slat pairs 293. Thus, in this embodiment, inflation of one of the airbags 294 causes the trailing slat 292*b* of the leading pair 293*a* and the leading slat 292*a* of the trailing pair 293*b* to pivot upwards from the respective shared joints 294 of the leading and trailing pairs 293*a,b*. The shared joints 294 can each be supported by a surface that is elevated above the inner belt 204 by substantially the same distance as the uninflated airbags 295. In this manner, the each slat 292 that overlies two uninflated airbags 295 will be substantially parallel with the underlying inner belt 204.

It is to be appreciated that while the illustrated embodiment depict the peaks extending outward from the primary belt portion 50, in other embodiments, the belt 4 can define valleys positioned inwardly from the primary belt portion 50 with respect to the orthogonal belt direction Z, and round objects 22*a* can be located at least partially within the valleys.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments. Additionally, the present invention is not intended to be limited by any statements in the Background section, such as references to application of the invention to an order fulfillment center.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed is:

1. A conveyor system, comprising:
a conveyor defining an object induction region and an object destination region, the conveyor comprising:
a roller assembly extending at least from the object induction region to the object destination region in a direction of conveyance, the roller assembly having a top side and an underside;
a belt wound around the roller assembly along a belt axis, the belt configured to convey round objects along the top side of the roller assembly in the direction of conveyance to the object destination region, the belt comprising a plurality of adjacent belt segments disposed along the belt axis so as to define a primary belt portion, wherein the belt axis extends through the primary belt portion, each segment having a trailing end and a leading end spaced from the trailing end with respect to the direction of conveyance; and
an actuator configured to selectively guide at least one of the leading and trailing ends of at least one of the segments away from the primary belt portion so as to define a peak in the belt, wherein the conveyor is configured so that the peak travels along the direction of conveyance at least from the object induction region to the object destination region.

2. The conveyor system of claim 1, wherein the peak is a first peak, the actuator is configured to selectively guide at least one of the leading and trailing ends of at least another one of the segments outward from the primary belt portion so as to define a second peak in the belt, wherein the conveyor is configured so that the second peak travels behind the first peak along the direction of conveyance at least from the object induction region to the object destination region.

3. The conveyor system of claim 2, further comprising a placement mechanism configured to place a cylindrical object on the belt between the first and second peaks, wherein the first and second peaks are spaced from each other so as to substantially prevent the cylindrical object from rolling along the belt.

4. The conveyor system of claim 1, wherein at least some of the belt segments are rigid.

5. The conveyor system of claim 1, wherein at least some of the belt segments are elastic.

6. A conveyor system, comprising:
a roller assembly;
a belt wound around the roller assembly along a belt axis oriented along a direction of conveyance, the belt configured to convey objects along the roller assembly in the direction of conveyance, wherein the belt includes a primary belt portion that is in contact with rollers of the roller assembly and defines the belt axis;
an actuator configured to cause the belt to selectively define at least one belt peak that protrudes from the primary belt portion at a peak height measured orthogonally from the belt axis, wherein the at least one belt peak is elongate along a lateral direction oriented at an angle with respect to the direction of conveyance.

7. The conveyor system of claim 6, wherein the peak height is in the range of about 0.5 inch and 2.5 inches.

8. The conveyor system of claim 6, wherein the peak height is no more than 1.25 inches.

9. The conveyor system of claim 6, wherein the conveyor system comprises a conveyor that defines a peak-building region in which the at least one peak is formed in the belt, an object induction region downstream of the peak-building region, an object destination region downstream of the object induction region, and a peak-levelling region in which the at least one peak is removed in the belt, wherein the peak-levelling region is downstream of the object destination region, and wherein the actuator engages the belt in the peak-building region.

10. The conveyor system of claim 9, wherein at least one of the peak-building region and the peak-levelling region is located on a top side of the roller assembly.

11. The conveyor system of claim 9, wherein at least one of the peak-building region and the peak-levelling region is located on an underside of the roller assembly.

12. The conveyor system of claim 9, wherein the peak-building region is at a proximal end of the conveyor, wherein, at the proximal end, the belt transitions from moving in a return direction to moving in the direction of conveyance, the return direction opposite the direction of conveyance.

13. The conveyor system of claim 6, further comprising a pair of side tracks extending alongside the belt such that the belt is positioned between the pair of side tracks with respect to the lateral direction, wherein the lateral direction is substantially perpendicular to the direction of conveyance, and the belt defines opposed lateral sides and includes followers that extend from the lateral sides and ride along the pair of side tracks.

14. The conveyor system of claim 13, wherein:
each side track of the pair of side tracks includes a primary track and an outer track, wherein the outer track intersects the primary track at a switchpoint and defines a parallel region downstream of the switchpoint, wherein, in the parallel region, the outer track is spaced from the primary track by a constant distance that is substantially equivalent to the peak height,
the followers are configured to ride along either of the primary and secondary tracks; and
the actuator is configured to selectively direct at least one of the followers to the secondary track so as to define the at least one peak.

15. The conveyor system of claim 14, wherein the outer track converges with the primary track at a return point located downstream of the parallel region, wherein the at least one of the followers is automatically returned to the primary track at the return point so as to flatten the peak back to the primary belt portion.

16. The conveyor system of claim 14, wherein the belt comprises a plurality of links coupled together at joints, such that each joint couples a respective leading link of the plurality of links to a respective trailing link of the plurality of links, at least some of the joints define a joint axis oriented along the lateral direction, and the followers extend from the at least some of the joints.

17. The conveyor system of claim 16, wherein the links are elastic, and the respective leading link and the respective trailing link stretch so as to define the at least one peak when the associated follower rides along the outer track.

18. A conveyor system, comprising:
a roller assembly;
a belt wound around the roller assembly along a belt axis, the belt configured to convey objects along the roller assembly in a direction of conveyance, wherein the belt includes a primary belt portion that is in contact with rollers of the roller assembly and defines the belt axis, and belt comprises:
a plurality of rigid links coupled together at joints, such that each joint couples a respective leading link of the plurality of rigid links to a respective trailing link of the plurality of rigid links, and the respective leading and trailing links are each pivotable about the respective joint that couples the respective leading and trailing links together;
an actuator that is configured to move at least a select one of the joints outward so as to define at least one belt peak that protrudes from the primary belt portion at a peak height measured orthogonally from the belt axis.

19. The conveyor system of claim 18, wherein at least one of the respective leading link and the respective trailing link of the at least a select one of the joints includes a locking feature, and the actuator is configured to activate the locking feature so as to lock the respective leading and trailing links together at an orientation that defines the at least one belt peak.

20. The conveyor system of claim 18, further comprising a first inflatable compartment positioned between the roller assembly and the respective trailing link, and a second inflatable compartment positioned between the roller assembly and the respective leading link, wherein the actuator comprises an inflation device configured to inject compressed air into the first and second inflation compartments so as to pivot the respective leading and trailing links outward in a manner defining the at least one belt peak.

* * * * *